United States Patent
Suzuki et al.

(10) Patent No.: US 6,538,391 B1
(45) Date of Patent: Mar. 25, 2003

(54) IMAGE DISPLAY AND A MANUFACTURING METHOD OF THE SAME

(75) Inventors: Mutsumi Suzuki, Kodaira (JP);
Masakazu Sagawa, Inagi (JP);
Toshiaki Kusunoki, Tikorozawa (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 10/030,982

(22) PCT Filed: Sep. 4, 2000

(86) PCT No.: PCT/JP00/05988

§ 371 (c)(1),
(2), (4) Date: Jan. 16, 2002

(87) PCT Pub. No.: WO01/20639

PCT Pub. Date: Mar. 22, 2001

(30) Foreign Application Priority Data

Sep. 9, 1999 (JP) .......................................... 11-255869

(51) Int. Cl.[7] ................................................. G09G 3/10
(52) U.S. Cl. ............................... 315/169.3; 315/169.4; 313/495
(58) Field of Search ........................ 315/169.3, 169.4, 315/169.2, 169.1; 345/40, 30; 313/495, 500

(56) References Cited

U.S. PATENT DOCUMENTS 5,449,970 A  *  9/1995  Kumar et al. ................ 313/495
5,557,159 A  *  9/1996  Taylor et al. ................ 313/336
5,998,924 A  * 12/1999  Yamamoto et al. ......... 313/496
6,294,876 B1 *  9/2001  Ando et al. ............... 315/169.1
6,377,002 B1 *  4/2002  Ge et al. ..................... 315/366

FOREIGN PATENT DOCUMENTS

JP          9-320456        11/1996

* cited by examiner

Primary Examiner—Don Wong
Assistant Examiner—Ephrem Alemu

(57) ABSTRACT

The present invention provides an image display capable of enhancing a production yield. The image display comprises a display device including a first plate which has a plurality of electron-emitter elements each having a structure comprised of a base electrode, an insulating layer and a top electrode stacked on one another in this order, the electron-emitter element emitting electrons from the surface of the top electrode when a voltage of positive polarity is applied to the top electrode; a plurality of first electrodes for respectively applying driving voltages to the base electrodes of the electron-emitter elements lying in a row (or column) direction; and a plurality of second electrodes for respectively applying driving voltages to the top electrodes of the electron-emitter elements lying in the column (or row) direction, a frame component, and a second plate having phosphors, wherein a space surrounded by the first plate, the frame component and the second plate is brought into vacuum. In the display apparatus, the at least one electron-emitter element includes the base electrode and the top electrode, at least one of which is connected to the first electrode or the second electrode through a resistor element.

22 Claims, 10 Drawing Sheets

(a)

(b)

(a)

(b) THINNER PART

IMAGE DISPLAY AND A MANUFACTURING METHOD OF THE SAME

BACKGROUND OF THE INVENTION

The present invention relates to an image display and a method of manufacturing the same, and particularly to a technology effective for application to a display apparatus which has thin-film electron emitters having an electrode-insulator-electrode structure to emit electrons into vacuum.

The thin-film electron emitters are electron-emitter elements each using hot electrons produced by applying a high electric field to an insulator.

As a typical example, an MIM (Metal-Insulator-Metal) electron emitter comprising a thin film having a three-layer structure of a top electrode-insulating layer-base electrode will be explained.

FIG. 14 is a diagram for describing the principle of operation of an MIM electron emitter illustrated as a typical example of a thin-film electron emitter.

A driving voltage is applied between a top electrode 11 and a base electrode 13 to set an electric field within a tunneling insulator 12 to 1 MV/cm to 10MV/cm and over. Thus, electrons placed in the neighborhood of the Fermi level in the base electrode 13 are transmitted through a barrier by tunneling phenomena. Thereafter, they are injected into the conduction bands of the tunneling insulator 12 and top electrode 11, thereby resulting in hot electrons.

Some of these hot electrons are subjected to scattering under interaction with a solid in the tunneling insulator 12 and the top electrode 11, thus leading to the loss of energy.

As a result, hot electrons having various energies exist when they have reached an interface between the top electrode 11 and vacuum 10.

Of these hot electrons, ones having energy larger than the work function $\phi$ of the top electrode 11 are emitted into the vacuum 10, and ones other than the above ones flow into the top electrode 11.

Assuming that a current based on the electrons flowing from the base electrode 13 to the top electrode 11, is called a diode current (Id), and a current based on the electrons emitted into the vacuum 10 is called an emission current (Ie), an electron emission efficiency (Ie/Id) ranges from about $1/10^3$ to about $1/10^5$.

Incidentally, the MIM thin-film electron emitter has been described in, for example, Japanese Patent Application Laid-Open No. Hei 9-320456.

Now, the top electrode 11 and the base electrode 13 are provided in plural form and these plural top electrodes 11 and base electrodes 13 are formed orthogonal to one another to thereby form thin-film electron emitters in matrix form. Consequently, electron beams can be produced from arbitrary locations and hence they can be used as electron emitters for a display apparatus.

Namely, a display apparatus can be constructed wherein thin-film electron-emitter elements are placed at every pixel, and electrons emitted therefrom are accelerated in vacuo and thereafter applied to each of phosphors to thereby allow the applied phosphor to emit light, whereby a desired image is displayed thereon.

The thin-film electron emitters have excellent features as electron-emitter elements for the display apparatus in that they are capable of implementing a high-resolution display apparatus because the emitted electron beams are excellent in directionality, and they are easy to handle because they are insusceptible to the influence of their surface contamination, for example.

In the display apparatus using the conventional thin-film electron emitters, when one of a large number of thin-film electron-emitter elements (electron emission regions) placed in matrix form was short-circuited due to a failure in manufacture thereof or other reasons, no electrons were emitted from all the thin-film electron-emitter elements on a row or/and a column to which such a thin-film electron-emitter element was connected, thus causing no light emission. Namely, a "point defect" of one thin-film electron-emitter element has caused a "line defect".

The above-described point will be explained below.

FIG. 15 is a diagram showing a schematic configuration of a conventional thin-film electron-emitter matrix.

Thin-film electron-emitter elements 301 are respectively formed at points where row electrodes (base electrodes) 310 and column electrodes (top electrodes) 311 intersect respectively.

Incidentally, while the thin-film electron-emitter matrix is illustrated with 3 rows and 3 columns in FIG. 15, the thin-film electron-emitter elements 301 are actually placed by the number of pixels constituting a display apparatus, or the number of sub-pixels in the case of a color display apparatus.

Now, the respective thin-film electron-emitter elements 301 are directly connected to the row electrodes 310 and the column electrodes 311 respectively.

Therefore, when, for example, a thin-film electron-emitter element 301 placed at an intersection (R2, C2) of a row electrode 310 of R2 and a column electrode 311 of C2 is short-circuited due to a failure in manufacture thereof or the like, the row electrode 310 of R2 and the column electrode 311 of C2 are short-circuited. Hence even if an attempt were made to apply a suitable voltage to both electrodes from a row electrode driving circuit 41 or a column electrode driving circuit 42, the voltage would not be applied thereto.

Therefore, all the thin-film electron-emitter elements 301 on the row electrode of R2, or/and all the thin-film electron-emitter elements 301 on the column electrode 311 of C2 are not operated, thus causing a "line defect".

Even if elements equivalent to about $1/10000$ of the total number of pixels have "point defects" in a matrix-type display apparatus such as a liquid-crystal display apparatus or the like, no problem occurs from a practical standpoint and they can be used in most cases.

Namely, about 100 "point defects" can be allowed in the case of a display apparatus configured in 480×640×3 dots, for example.

However, one having a "line defect" such as non-light emission of all elements on one line cannot be used as a display apparatus.

Thus, the display apparatus using the conventional thin-film electron emitters was accompanied by a problem that the "point defects"produced the "line defect", thereby reducing production yields.

SUMMARY OF THE INVENTION

The present invention has been made to solve the problem of the prior art. An object of the present invention is to provide a technology capable of enhancing production yields in an image display.

The above, other objects and novel features of the present invention will become apparent from the description of the present specification and the accompanying drawings.

Summaries of typical one of the inventions disclosed in the present application will be described in brief as follows:

There is provided an image display which comprises a display device including a first plate which has a plurality of electron-emitter elements each having a structure comprised of a base electrode, an insulating layer and a top electrode stacked on one another in this order, the electron-emitter element emitting electrons from the surface of the top electrode when a voltage of positive polarity is applied to the top electrode; a plurality of first electrodes for respectively applying driving voltages to the base electrodes of the electron-emitter elements lying in a row (or column) direction, of the plurality of electron-emitter elements; and a plurality of second electrodes for respectively applying driving voltages to the top electrodes of the electron-emitter elements lying in the column (or row) direction, of the plurality of electron-emitter elements, a frame component, and a second plate having phosphors, whereby a space surrounded by the first plate, the frame component and the second plate is brought to vacuum, wherein at least one the electron-emitter element includes its corresponding base electrode and top electrode at least one of which is connected to the first electrode or second electrode through a resistor element.

Namely, the present invention is characterized in that a resistor is inserted between a column electrode and a thin-film electron-emitter element or between a row electrode and a thin-film electron-emitter element, or resistors are respectively inserted between a column electrode and a thin-film electron-emitter element and between a row electrode and a thin-film electron-emitter element.

FIG. 1 is a diagram showing a schematic configuration of one example of a thin-film electron-emitter matrix of an image display of the present invention.

The image display shown in FIG. 1 is equipped with a thin-film electron-emitter matrix in which resistors 305 are respectively inserted between column electrodes 311 and thin-film electron-emitter elements 301.

Incidentally, the resistors 305 will be called pixel resistors in the following description.

While one pixel is formed of a combination of respective sub-pixels of red, blue and green in the case of a color image display, the "pixels" defined herein are equivalent to the sub-pixels in the case of the color image display. In the present specification, pixels in the case of a monochrome image display, and sub-pixels in the case of a color image display are also called "dots".

Consider where the resistance value of the resistor 305 is set to 10 times or more the output impedance of each column electrode driving circuit 42. Since the resistance between a row electrode 310 of R2 and a column electrode of C2 is sufficiently larger than the output impedance of the corresponding driving circuit even if a thin-film electron-emitter element 301 at (R2, C2) is short-circuited, a sufficient voltage is applied to both electrodes and hence other thin-film electron-emitter elements 301 on both electrodes normally operate. Of course, the thin-film electron-emitter element 301 at (R2, C2) does not operate.

Thus, the present invention is capable of preventing the "point defects" from leading to the "line defect".

The following restrictions are imposed on the resistance value (Rr) of the pixel resistor 305.

Assuming that capacitance obtained by adding together parasitic capacitance of each thin-film electron-emitter element per se and parasitic capacitance within one pixel is defined as Ce, Ce·Rr results in time constant of a change in signal voltage applied to the corresponding thin-film electron-emitter element 301.

Thus, (Ce·Rr<1H) must be taken when used as the display apparatus.

Here, 1H indicates a horizontal scanning period. Assuming that a field frequency is defined as f and the effective number of scan lines is defined as Neff (when two lines are simultaneously driven: (the number of scan lines÷2)), the horizontal scanning period (1H) is given by the following equation (1):

$$1H = 1/(f \cdot \text{Neff}) \quad (1)$$

When f=60 Hz and Neff=256, for example, 1H=64 µs is obtained.

A second effect of the present invention resides in that the influence of deviations in characteristics of wire resistance and a driving circuit can be reduced.

Such a functional relation as expressed by the following equation (2) is established between a diode voltage (Vd) applied between both electrodes (top electrode 11 and base electrode 13) of the thin-film electron emitter 301 and a diode current (Id) flowing therebetween:

$$Id = f(Vd) \quad (2)$$

On the other hand, the total wire resistance of the row electrodes 310 and column electrodes 311 is defined as R(line) the output impedance of each row electrode driving circuit 41 is defined as Zout(row), and the output impedance of each column electrode driving circuit 42 is defined as Zout(column).

Assuming that the difference between a voltage outputted from the row electrode driving circuit 41 and a voltage outputted from the column electrode driving circuit 42, i.e., an externally applied voltage is defined as V0, the diode voltage (Vd) applied across the thin-film electron-emitter element 301 is expressed in the following equation (3):

$$Vd = V0 - Id(R(\text{line}) + Zout(\text{row}) + Zout(\text{column})) \quad (3)$$

Thus, the diode current (Id) that flows through the thin-film electron-emitter element 301, is expressed in the following equation (4):

$$Id = f[V0 - Id(R(\text{line}) + Zout(\text{row}) + Zout(\text{column}))] \quad (4)$$

Therefore, when deviations ΔR(line), ΔZout(row) and ΔZout(column) exist in R(line), ΔZout(row) and ΔZout (column), respectively, the diode current (Id) also varies in its current value.

A current (emission current) (Ie) emitted into vacuum from the thin-film electron-emitter element 301 varies according to the current value of the diode current (Id).

Accordingly, brightness non-uniformity occurs in the display apparatus.

In the present invention, the resistors 305 are inserted every thin-film electron-emitter elements. Assuming that the resistance value of the resistor 305 is defined as Rr, a diode voltage (Vd) applied across the thin-film electron-emitter element 301 is expressed in the following equation (5):

$$Vd = V0 - Id(Rr + R(\text{line}) + Zout(\text{row}) + Zout(\text{column})) \quad (5)$$

Then, Rr is set so as to become larger than the deviations ΔR(line), ΔZout(row) and ΔZout(column). Consequently, these deviations will not cause a deviation in the current value of the diode current (Id) and hence no brightness non-uniformity occurs.

Next consider the influence of a deviation in the resistance value of the pixel resistor 305 on a deviation in the amount of the emission current.

Let's assume that the externally applied voltage V0 is applied over all. The influence of the deviation in the resistance value R of the pixel resistor 305 on the current that flows through the thin-film electron-emitter element 301 is estimated.

Assuming that the diode current-voltage characteristics of the thin-film electron-emitter element 301 are represented as Id=f(V), and currents that flow when the resistance value of the pixel resistor 305 is given as R and R+ΔR, are respectively defined as I and I+ΔI, the relation expressed in the following equation (6) is established:

$$\frac{\Delta I}{I} = \left(\frac{\Delta R}{R + \Delta R}\right) / (1 + \alpha) \quad (6)$$

$$\alpha = \frac{r_e}{R + \Delta R}$$

$$r_e = \frac{dV}{dI_d}$$

Thus, if the resistance value R+ΔR of the pixel resistor 305 is set smaller than a differential resistance re of the thin-film electron-emitter element 301 (in an operation region).

If $\alpha \geq 1$ is established, then the above equation (6) can be transformed as the following equation (7):

$$\frac{\Delta I}{I} \leq \frac{1}{2}\left(\frac{\Delta R}{R + \Delta R}\right) \quad (7)$$

Thus, the influence of the deviation αR in the resistance value of the pixel resistor 305 on uniformity of a displayed image is lessened.

In other words, the allowance of the deviation in the resistance value of the pixel resistor 305 becomes large and hence the display apparatus is easy to be manufactured.

The present invention provides a display apparatus which comprises a display device including a first plate which has a plurality of electron-emitter elements each having a structure comprised of a base electrode, an insulating layer and a top electrode stacked on one another in this order, the electron-emitter element emitting electrons from the surface of the top electrode when a voltage of positive polarity is applied to the top electrode; a plurality of first electrodes for respectively applying driving voltages to the base electrodes of the electron-emitter elements lying in a row (or column) direction, of the plurality of electron-emitter elements; and a plurality of second electrodes for respectively applying driving voltages to the top electrodes of the electron-emitter elements lying in the column (or row) direction, of the plurality of electron-emitter elements, a frame component, and a second plate having phosphors, whereby a space surrounded by the first plate, the frame component and the second plate is brought into vacuum, wherein the at least one electron-emitter element includes its corresponding base electrode and top electrode at least one of which is connected to the first electrode or second electrode through a resistor element or a connection wire.

In the present invention, when a defect due to a short circuit of the thin-film electron-emitter element 301 is found at a production stage, the corresponding element is cut off to thereby enable prevention of the occurrence of the "line defect".

FIG. 16 is a plan view showing a thin-film electron-emitter element structure of a conventional thin-film electron-emitter matrix.

In the conventional thin-film electron-emitter matrix as shown in FIG. 16, thin-film electron-emitter elements 301 are respectively formed at regions where row electrodes 310 and column electrodes 311 spatially overlap in fact. It was therefore difficult to separate only the thin-film electron-emitter elements 301 from the row electrodes 310 or column electrodes 311.

In the present invention, as will be described in detail in the following embodiments, electron-emitter structures of respective pixels are devised to thereby easily separate thin-film electron-emitter elements 301 at specific pixels through the use of a laser repair technology or breakage by current-heating, whereby the occurrence of "line defects" can be lessened.

Incidentally, a prior-art search has been carried out based on the result of the present invention from the viewpoint that the resistors are formed in every pixels.

As a result, the corresponding art has not been found in the display apparatus using the thin-film electron emitters, which is intended for the present invention.

As a result of a further investigation of objects to be researched, which is extended up too other-types electron emitters, an example in which a resistive sheet is inserted into individual pixels in field-emission electron emitters, has been found out in EURODISPLAY' 90, 10th International Display Research Conference Proceedings (vde-verlag, Berlin, 1990), pp. 374–377.

This reference describes a field-emitter array comprising multiplicity of electron-emitting tips(emitter tips) for each pixel. By introducing a resister sheet which functions as resistance independently for each emitter tip, a negative feedback resulting from the voltage drop in the resistor at each emitter tip averages the current deviation among the every emitter tips in each pixel, and thereby alleviating the deviation.

The reference above mentioned aims to solve the problem that only specific emitter tips inside a pixel emit a large current, thus generating "bright spots" inside the pixel which causes degradation in image quality.

Further, the technology described in the known art encounters difficulties in cutting off a defect pixel with laser beam irradiation or the like for defect repairing.

DETAILED DESCRIPTION OF THE PREFERRED EMBODIMENTS

Figure 1:
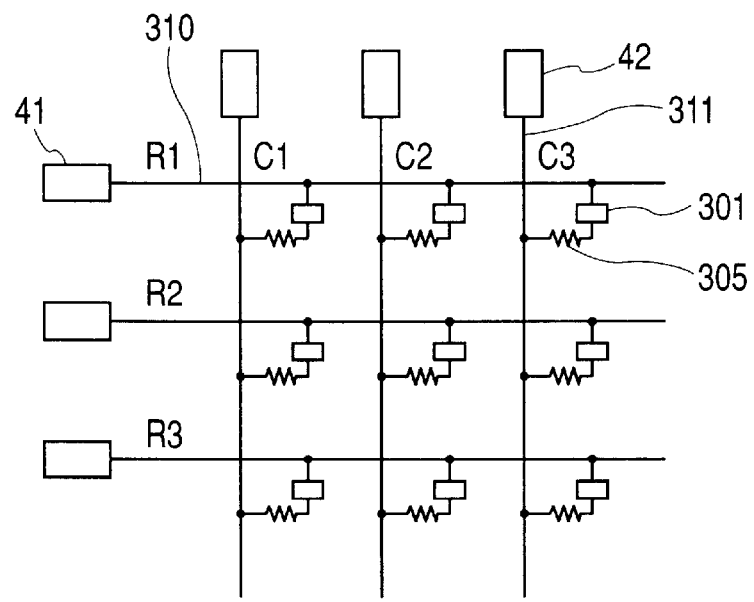
FIG. 1 is a diagram showing a schematic configuration of one example of a thin-film electron-emitter matrix of an image display of the present invention.

Preferred embodiments of the present invention will hereinafter be described in detail with reference to the accompanying drawings.

Incidentally, elements of structure each having the same function in all drawings for describing the embodiments are respectively identified by the same reference numerals and their repetitive description will therefore be omitted.

Embodiment 1

An image display according to an embodiment 1 of the present invention has a configuration wherein a display panel (display device of the present invention) in which brightness-modulation elements for respective dots are formed by combining a thin-film electron-emitter matrix functioning as electron emitters used for emitting electrons and phosphors, is used to connect driving circuits to row electrodes and column electrodes of the display panel respectively.

Now the display panel comprises a cathode plate formed with a thin-film electron-emitter matrix, and a phosphor plate formed with phosphor patterns.

Figure 2:
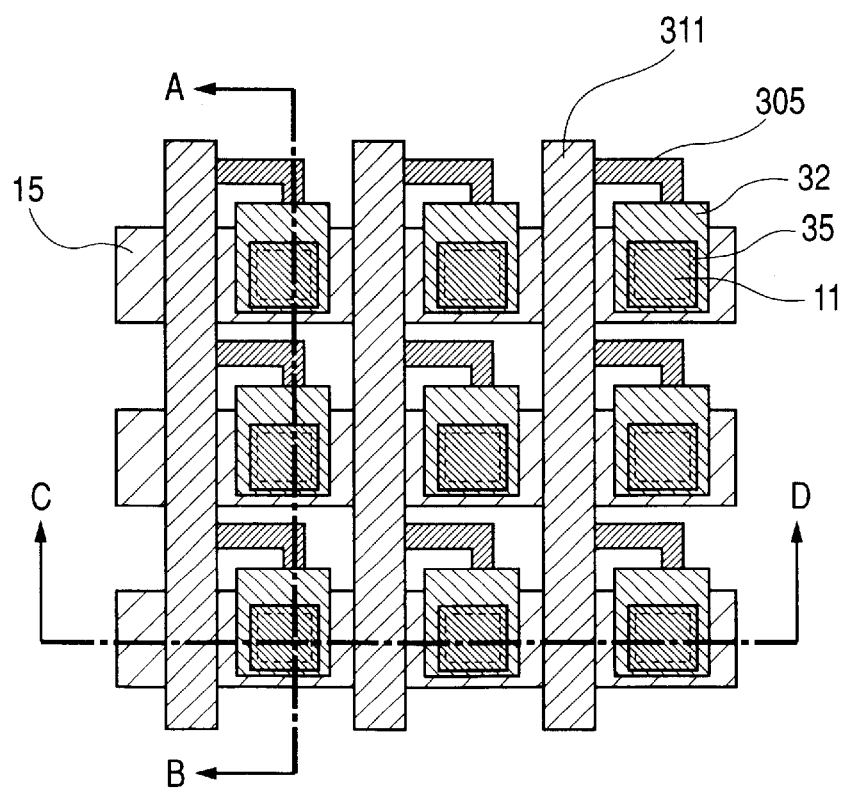
FIG. 2 is a plan view illustrating a configuration of part of a thin-film electron-emitter matrix of a cathode plate employed in an embodiment 1 of the present invention.
Figure 3:
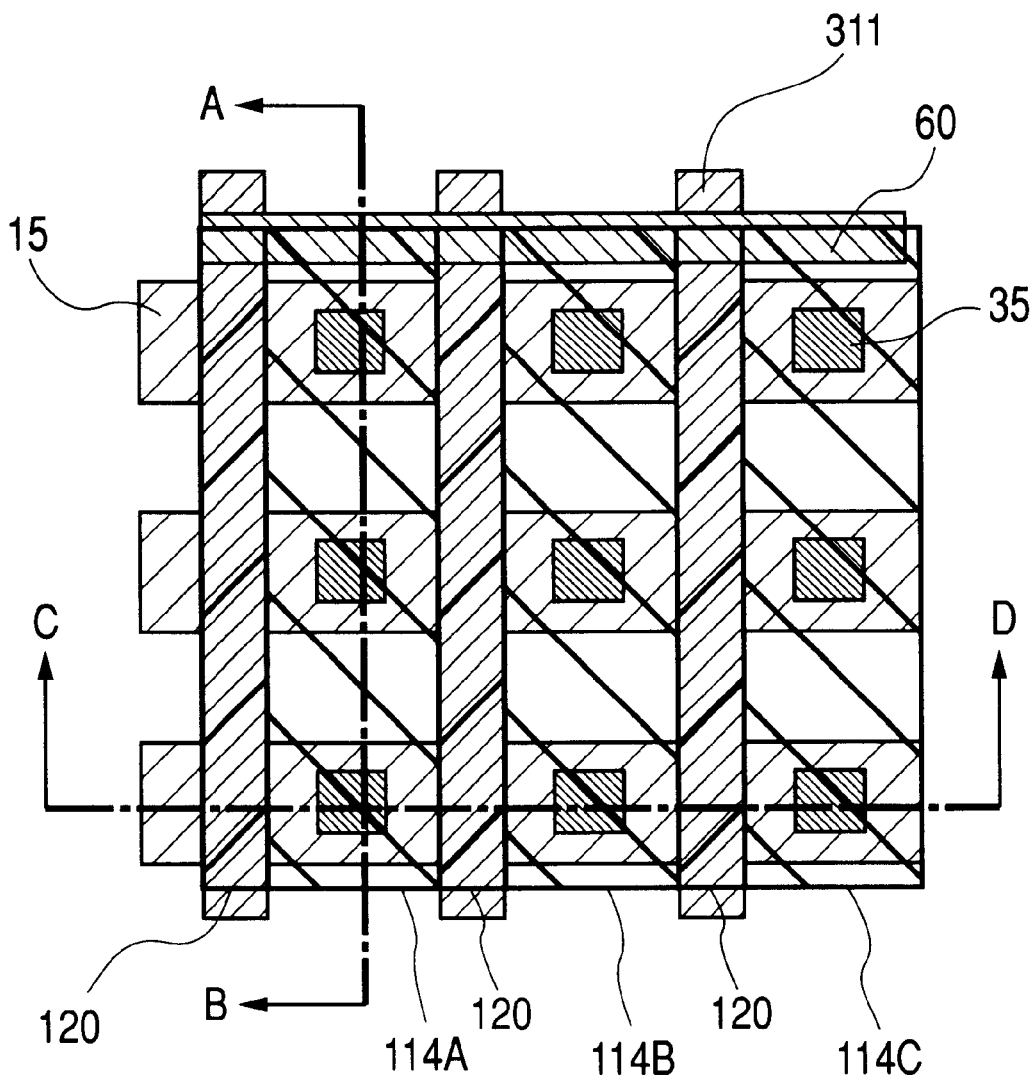
FIG. 3 is a plan view showing the relationship in position between the cathode plate and a phosphor plate employed in the embodiment 1 of the present invention.

FIG. 2 is a plan view showing a configuration of part of a thin-film electron-emitter matrix of a cathode plate according to the present embodiment, and FIG. 3 is a plan view showing the relationship in position between the cathode plate and phosphor plate according to the present embodiment, respectively.

Figure 4:
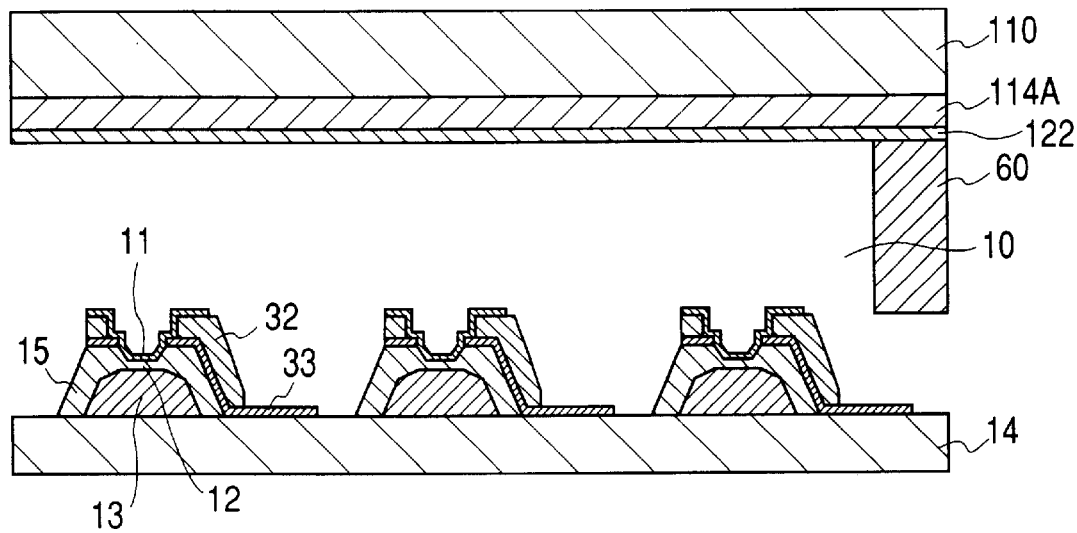
FIGS. 4(*a*) and 4(*b*) are respectively fragmentary cross-sectional views depicting a configuration of an image display according to the embodiment 1 of the present invention.
Figure 4:
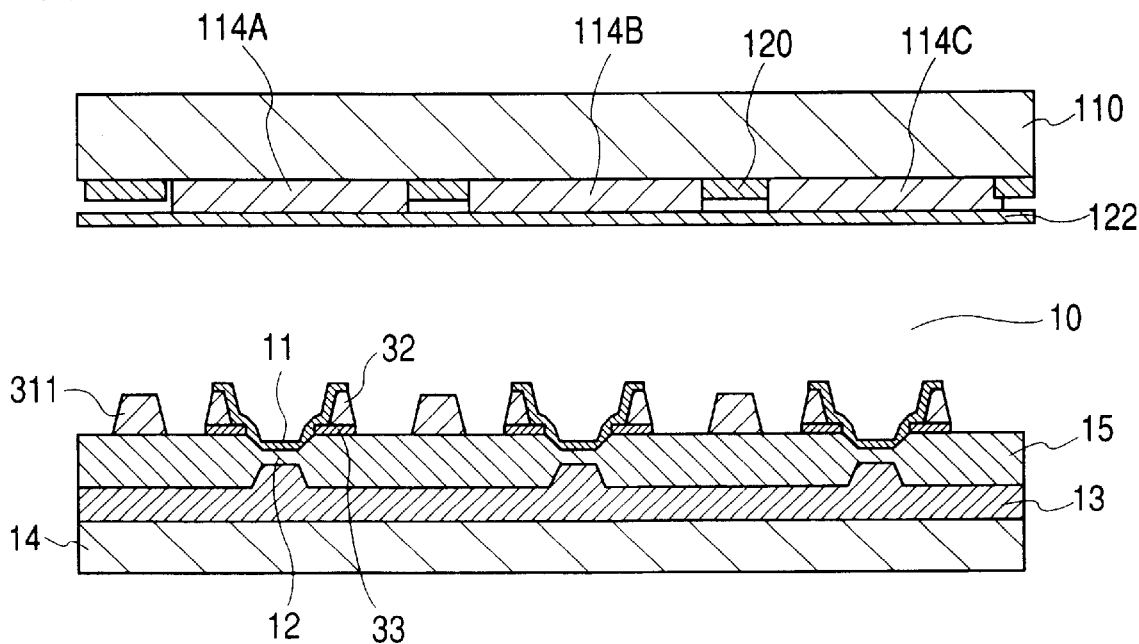

FIG. 4 is a fragmentary cross-sectional view showing a configuration of the image display according to the present embodiment, wherein FIG. 4(a) is cross-sectional views taken along cut lines A–B shown in FIGS. 2 and 3, and FIG. 4(b) is cross-sectional views taken along cut lines C–D shown in FIGS. 2 and 3.

However, the illustration of a plate 14 is omitted from FIGS. 2 and 3.

Further, a reduction scale as viewed in a vertical height direction is arbitrary in FIG. 4. Namely, while base electrodes 13, top electrode buslines 32, and the like are respectively less than or equal to a few $\mu$m in thickness, the distance between the plate 14 and a plate 110 is equivalent to a length of from about 1 mm to about 3 mm.

While the following description is made using an electron-emitter matrix with 3 rows and 3 columns, it is needless to say that the numbers of rows and columns in an actual display panel respectively result in several hundreds rows to a few thousand rows, and a few thousand columns.

In FIG. 2, regions 35 surrounded by dot lines indicate electron-emission regions (electron-emitter elements in the present invention) respectively.

Each of the electron-emission regions 35 emits electrons into vacuum from within its area or region at a location defined by a tunneling insulator 12.

Since the electron-emission region 35 is not represented on a plan view because it is covered with a top electrode 11, it is illustrated by a dotted line.

Figure 5:
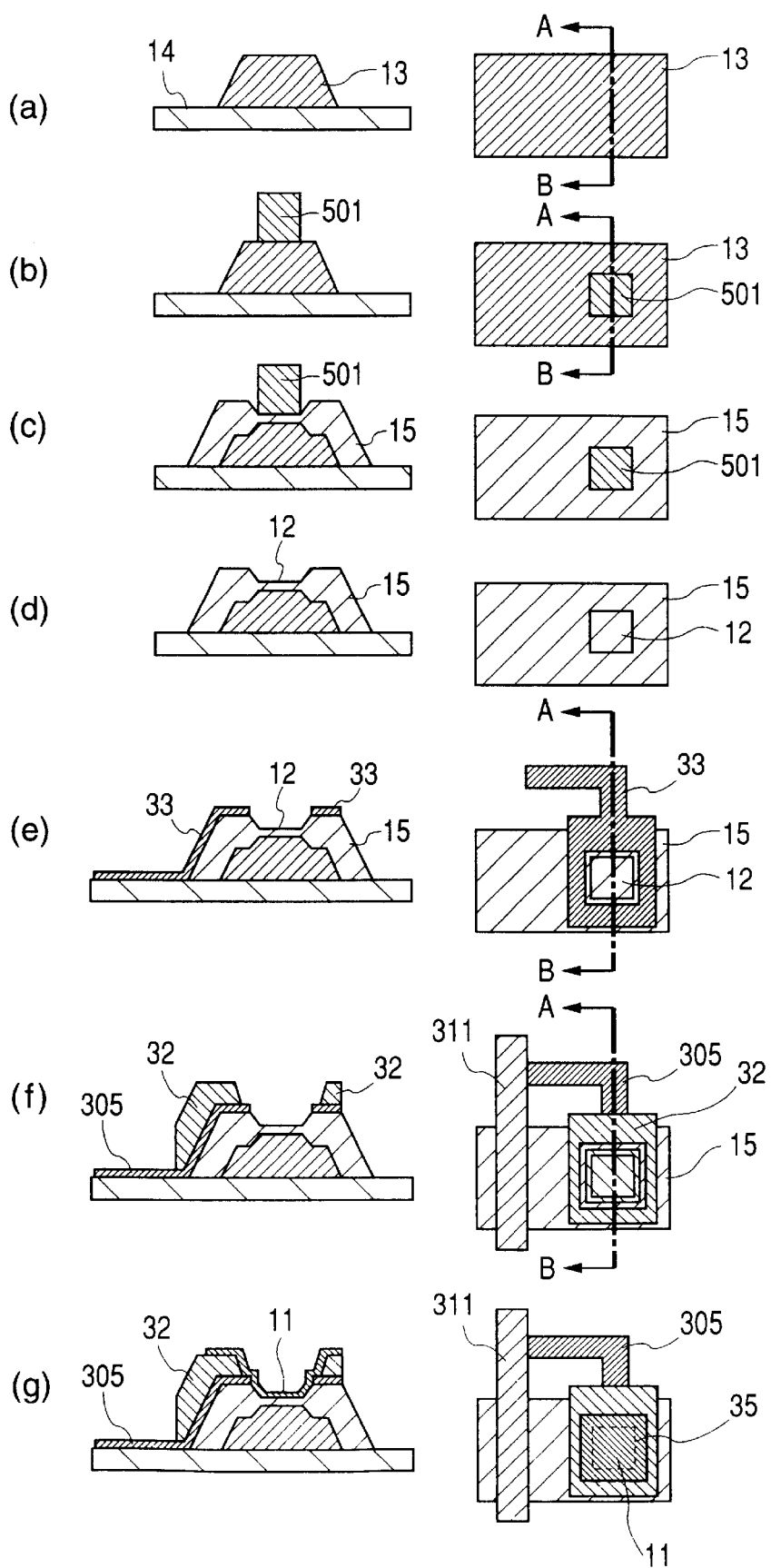
FIGS. 5(*a*) through 5(*g*) are respectively diagrams for describing a method of manufacturing the cathode plate employed in the embodiment 1 of the present invention.

FIG. 5 is a diagram for describing a method of manufacturing a cathode plate employed in the present embodiment.

A method of fabricating a thin-film electron-emitter matrix of the cathode plate employed in the present embodiment will be explained below with reference to FIG. 5.

Incidentally, while only one thin-film electron-emitter element 301 formed at a point where one of row electrodes 310 and one of column electrodes 311 both shown in FIGS. 2 and 3 intersect, is extracted and plotted in FIG. 5, a plurality of thin-film electron-emitter elements 301 are actually arranged in matrix form as illustrated in FIGS. 2 and 3.

Further, the right columns shown in FIG. 5 are respectively plan views, whereas the left columns are respectively cross-sectional views taken along lines A–B in the views on the right side.

An electrically conductive film for a base electrode 13 is formed with a thickness of 300 nm, for example, on an insulating substrate 14 such as glass or the like.

As a material for the base electrode 13, may be used, for example, an aluminum (Al: hereinafter called "Al") alloy.

In the present method, an Al-neodymium (Nd: hereinafter called "Nd") alloy was used.

For example, a sputtering method, resistive-heating evaporation or the like may be used to form such an Al alloy film.

Next, the Al alloy film is processed into strip form by resist formation using photo lithography and etching following it to thereby form a base electrode 13 as shown in FIG. 5(a).

A resist used herein may be one suitable for etching, and either of wet etching and dry etching may be used as the etching.

Next, a resist is applied and patterned by exposing it with an ultraviolet-ray, followed by patterning, thereby forming a resist pattern 501 as shown in FIG. 5(b).

As the resist, may be used, for example, a quinonediazide positive resist.

Next, anodic oxidation is done while the resist pattern 501 remains attached to the base electrode 13 to thereby form a protection layer 15 as shown in FIG. 5(c).

In the present embodiment, an anodization voltage was set to about 100V upon such anodic oxidation, and the thickness of the protection layer 15 was set to about 140 nm.

The resist pattern 501 is removed with an organic solvent such as acetone or the like and thereafter the surface of the base electrode 13 which had been covered with the resist is anodically oxidized again to thereby form a tunneling insulator 12 as shown in FIG. 5(d).

In the present embodiment, an anodization voltage was set to 6 V upon such re-anodization, and the thickness of the tunneling insulator was set to 8 nm.

Next, an electrically conductive film for a top electrode busline under-layer film is formed and the resist is patterned and subjected to etching to thereby form the top electrode busline under-layer film 33 as shown in FIG. 5(e).

In the present embodiment, titanium (Ti) was used as a material for the top electrode busline under-layer film, and the thickness thereof was set to about 20 nm.

Next, an electrically conductive film for a top electrode busline is formed and a resist is patterned and subjected to etching to thereby form the top electrode busline 32 and a column electrode 311 as shown in FIG. 5(f).

In the present embodiment, an Al alloy was used as a material for the top electrode busline 32 and the column electrode 311, and the thickness thereof was set to about 300 nm.

Incidentally, Au or the like may be used as the material for the top electrode busline 32 and the column electrode 311.

Next, an iridium (Ir) having a thickness of 1 nm, a platinum (Pt) having a thickness of 2 nm, and a gold (Au) having a thickness of 3 nm are formed by sputtering in that order.

According to a resist and patterning by etching, a multi-layer film of Ir—Pt—Au is patterned as the top electrode 11 as shown in FIG. 5(g).

Incidentally, a region 35 surrounded by a dotted line indicates an electron emission region in FIG. 5(g).

The electron-emission region 35, from which electrons emit into vacuum, is defined by the tunneling insulator 12.

The thin-film electron-mitter matrix is completed on the plate 14 according to the above-described process.

In the thin-film electron n-emitter matrix according to the present embodiment, electrons are emitted from the region (electron-emission region 35) defined by the tunneling insulator 12, i.e., the region define by the resist pattern 501.

Since the protection layer 15, which is of a thick insulating film, is for ed on the periphery of the electron-emission region 35, an electric field applied between the top electrode and the base electrode does not concentrate at sides or edges of the base electrode 13 and hence an electron emission characteristic stable over a long time is obtained.

The top electrode busline under-layer film 33 has three roles.

The first role resides in that a busline under-layer film 33, being thin in thickness is provided to make certain of an electrical contact between a top electrode 11, whose thickness is about 10 nm or less, and a top electrode busline 32, thereby improving reliability.

When the top electrode 11 is directly formed on the top electrode busline 32 except for the top electrode busline under-layer film 33, the top electrode 11 is easy to break at steps of the top electrode busline 32 (100 nm thick) and the reliability of a electrical connection between the top electrode busline 32 and the top electrode 11 is reduced.

The second role resides in the formation of a pixel resistor 305.

As shown in FIG. 5(g), the pixel resistor 305 is shaped in a bent form, and the resistance value of the pixel resistor 305 is defined as the value of resistance between the top electrode busline 32 and the column electrode 311.

The resistance value is determined according to a material for the pixel resistor 305, the thickness thereof, and the geometrical form of the pixel resistor 305.

When, for example, titanium (Ti) is used as the material for the top electrode busline under-layer film, the thickness thereof is set to 20 nm, and a length/width ratio is set to about 40, the resistance value Rr of the pixel resistor 305 results in about 1 k$\Omega$.

When a titanium nitride (TiN) film having a thickness of 20 nm is used, its length/with ratio may be set to about 10 and the pixel resistor 305 may be set to about 1 k$\Omega$.

Since a differential resistance (re) in an operation region, of each thin-film electron-emitter element 301 is a few 10 k$\Omega$, a condition of (re/Rr>1) is sufficiently satisfied.

Thus, the influence a deviation in the resistance value of each pixel resistor 305 on a displayed image is lessened for the above reason.

Since the electrostatic capacitance Ce of the thin-film electron-emitter element 301 is about 0.1 nF, Ce·Rr=0.1 $\mu$s and a condition of CeRr<1H is also sufficiently satisfied.

Here, 1H indicates a period, during which a signal corresponding to one row is applied, and varies according to the number of scan lines, a refresh rate (field period) and the like of the display apparatus. 1H=10 $\mu$s to 64 $\mu$s in typical cases.

The third role resides in serving itself as a "cut point" for separating a thin-film electron-emitter element 301 having caused a defect due to a short circuit at production from its corresponding column electrode 311.

Applying a voltage between a row electrode and a column electrode associated with the defect thin-film electron-emitter element 301 to thereby burn out the corresponding pixel resistor 305 may cut it off.

Alternatively, a laser beam may be applied to a portion of the pixel resistor 305 to cut off it.

Since this portion is formed of the thin top-electrode busline under-layer film 33, it is easy to cut.

Since other component are not placed underneath the pixel resistor 305, other region are not affected by the application of the laser beam.

Namely, it is of importance that at least part of the pixel resistor 305 exists in a location where it does not intersect both of the row electrode 311 and the column electrode 311.

Incidentally, when the thin-film electron-emitter element 301 having caused the defect due to the short circuit at production is separated from the corresponding column electrode 311, a connection wire for connecting the column electrode 311 and the thin-film electron-emitter element 301 may be used as an alternative to the pixel resistor 305.

Figure 6:
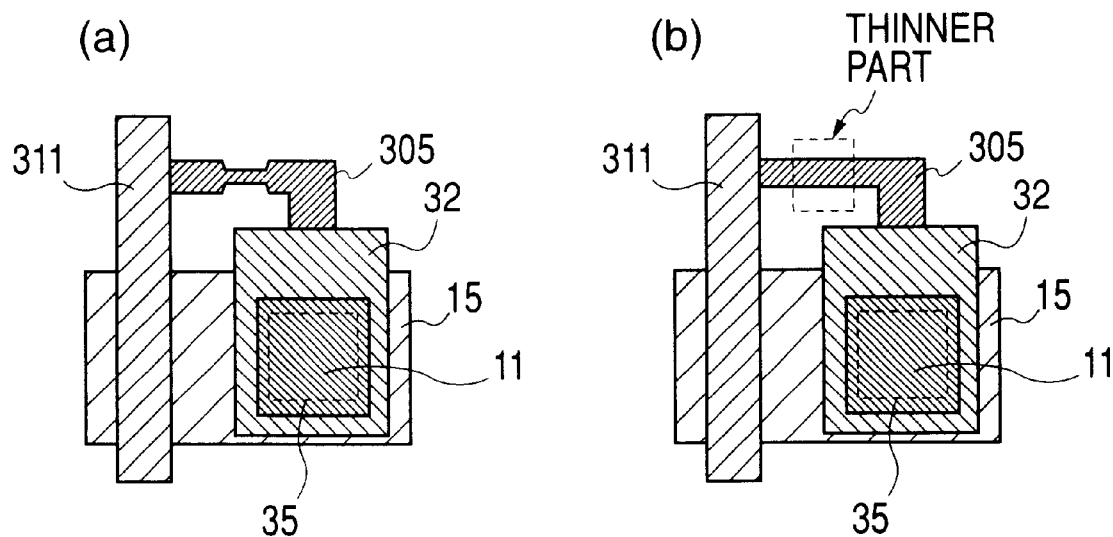
FIG. 6 is a diagram showing other shapes of pixel resistors employed in the embodiment 1 of the present invention.

FIG. 6 is a diagram showing another shape of the pixel resistor 305 employed in the present embodiment.

FIG. 6 corresponds to FIG. 5(g). As shown in FIG. 6(a), a thin or slight portion is provided at part of the pixel resistor 305, or a portion thin in thickness may be partly provided as shown in FIG. 6(b).

The pixel resistor 30 can thus be cut easier upon the cutting thereof by the application of the laser beam.

As described above, the advantage of the present embodiment resides in that each pixel resistor 305 is formed through the use of the process of forming the top electrode busline under-layer film 33, which is used to enhance the reliability of the electrical connectivity between the top electrode busline 32 and the top electrode 11.

This is made possible since the pixel resistor 305 is formed of the same material as the busline under-layer film 33.

Namely, as is understood from the manufacturing or fabricating process shown in FIG. 5, the pixel resistors are introduced according to the number of execution of lithography, which is identical to the conventional one.

Thus, an increase in the production cost due to the introduction of each pixel resistor 305 does not occur.

However, the present invention is not limited to it. The pixel resistor 305 may of course be formed of a material different from that for the busline under-layer film 33.

While a geometrical factor that will produce a deviation in the resistance value of each pixel resistor 305 at its production, results from the width and length of the pixel resistor 305, the former (width) is defined by a photo-mask at the formation of the pixel resistor 305. Therefore, the deviation in the width geometry is small.

The latter (length) side fined by a photo-mask at the formation of the column electrode 311 and the top electrode busline 32. Therefore, the deviation in the length geometry is small. Namely, the pixel resistor 305 can be formed with a small deviation.

There are steps each corresponding to the thickness (about 30 nm) of the base electrode 13 are provided between the base electrode 13 and the plate 14.

In the present embodiment, as shown in FIGS. 2 and 4, the top electrode busline 32 (about 300 nm in thickness) is designed to extend across the steps to thereby avoid wire breaking at the steps.

The phosphor plate according to the present embodiment comprises black matrixes 120 formed on a plate 110 such as soda lime glass or the like, phosphors (114A through 114C) of red (R), green (G) and blue (B), which are formed within trenches or grooves of the black matrixes 120, and a metal back film 122 formed over these.

A method of manufacturing the phosphor plate according to the present embodiment will be explained below.

The black matrixes 120 are formed on the plate 110 with the object of increasing the contrast ratio of the display apparatus (see FIG. 4(b)).

Next, the red phosphor 114A, green phosphor 114B and blue phosphor 114C are formed.

These phosphors were patterned by photo lithography in a manner similar to being used in the phosphor screen of the ordinary cathode-ray tube.

As the phosphors, for example, $Y_2O_2S:Eu$ (P22-R), $ZnS:Cu,Al$ (P22-G), and $ZnS:Ag$ (P22-B) were respectively used as red, green and blue.

Next, filming is effected on the plate 110 with a film such as nitrocellulose or the like and there after Al is evaporated onto the entire plate 110 with a thickness of from about 50 nm to about 300 nm to thereby produce the metal back film 122.

Thereafter, the plate 110 is heated at about 400° C. to pyrolize organic substances such as a filming film, PVA, etc. The phosphor plate is completed in this way.

The cathode plate and phosphor plate fabricated in this way are sealed with frit glass with a spacer 60 interposed therebetween.

A relationship of positions between the phosphors (114A through 114C) formed in the phosphor plate and the thin-film electron-emitter matrix of the cathode plate is represented as shown in FIG. 3.

Incidentally, the components on the plate 110 are illustrated by oblique lines alone in FIG. 3 to show the relationship of positions between the phosphors (114A through 114C), the black matrixes 120 and the components.

The relationship between the electron-emission region 35, i.e., the portion where the tunneling insulator 12 is formed, and the width of each of the phosphors (114A through 114C) is of importance.

In the present embodiment, the width of the electron-emission region 35 is designed so as to be narrower than that of each of the phosphors (114A through 114C) in consideration of an electron beam emitted from the thin-film electron emitter 301 being slightly broadened spatially.

Further, since FIG. 3 is a diagram for indicating the relationship of positions between the electron-emission regions 35 and the phosphors (114A through 114C), other components on the plate 14, e.g., the top electrodes 11, the top electrode buslines 32, and the pixel resistors 305 are omitted.

The distance between the plate 110 and the plate 14 is set so as to range from about 1 mm to about 3 mm.

The spacer 60 is inserted to prevent breakage of the display panel due to an external force of atmospheric pressure when the interior of the display panel is vacuumized.

Thus, when a display apparatus having a display area represented by less than or equal to a width of about 4 cm×a length of about 9 cm is fabricated by using glass having a thickness of 3 mm as for the plates 14 and 110, it can endure the atmospheric pressure owing to mechanical strengths of the plates 110 and 14 per se. It is therefore unnecessary to insert the spacer 60.

The spacer 60 is shaped in the form of a rectangular parallelepiped as shown in FIG. 3 by way of example.

While there are provided posts for the spacers 60 every three rows in the present embodiment, the number of the posts (layout density) may be reduced within an endurable range of mechanical strength.

Sheet-shape or pillar-shape posts made up of glass or ceramic are placed as the pacers 60.

Incidentally, while the spacer 60 seems like being not in contact with the plate 14 in FIG. 4(a), it is actually in contact with the column electrodes 311 on the plate 14.

In FIG. 4(a), a clearance can be defined by the thickness of the column electrode 311.

The sealed display panel is sealed off by being pumped to a vacuum of about $1×10^{-7}$ Torr.

In order to maintain the degree of vacuum in the display panel in a high vacuum, a getter film is formed or a getter material is activated at a predetermined position (not shown) lying within the display panel immediately before or after its sealing.

In the case of a getter material with barium (Ba) as a principal component, a getter film can be formed by inductive heating.

The display panel using the thin-film electron-emitter matrix is completed in this way.

Since the distance between the plate 110 and the plate 14 extends long so as to range from about 1 mm to about 3 mm in the present embodiment, an acceleration voltage applied to the metal back film 122 can be set to a high voltage of 3 KV to 6 KV. Thus, the phosphors for the cathode-ray tube (CRT) can be used for the phosphors (114A through 114C) as described above.

Figure 7:
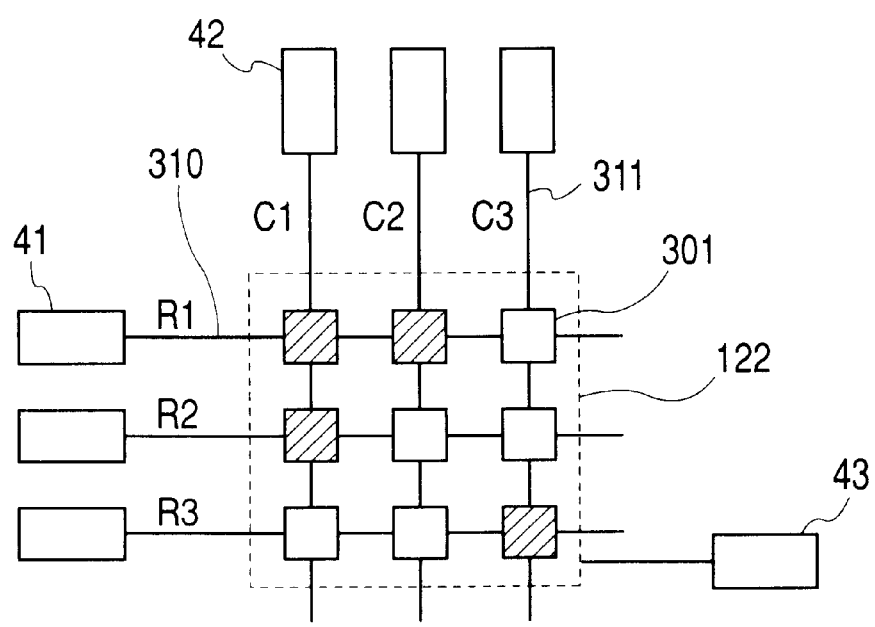
FIG. 7 is a connection diagram illustrating a state in which driving circuits are connected to a display panel employed in the embodiment 1 of the present invention.

FIG. 7 is a connection diagram showing a state in which driving circuits are connected to the display panel according to the present embodiment.

Row electrodes 310 (base electrodes 13) are respectively connected to row electrode driving circuits 41, and column electrodes 311 (top electrode buslines 32) are respectively connected to column electrode driving circuits 42.

Connections between the respective driving circuits (41 and 42) and a cathode plate are made by, for example, one obtained by subjecting a tape carrier package to connect-by-pressure by means of an anisotropically conductive film, or chip-on-glass or the like obtained by directly implementing a semiconductor chip constituting each of the driving circuits (41 and 42) on the plate 14 of the cathode plate.

An acceleration voltage, which ranges from about 3 KV to about 6 KV, is always applied to the metal back film 122 from an acceleration voltage source 43.

Figure 8:
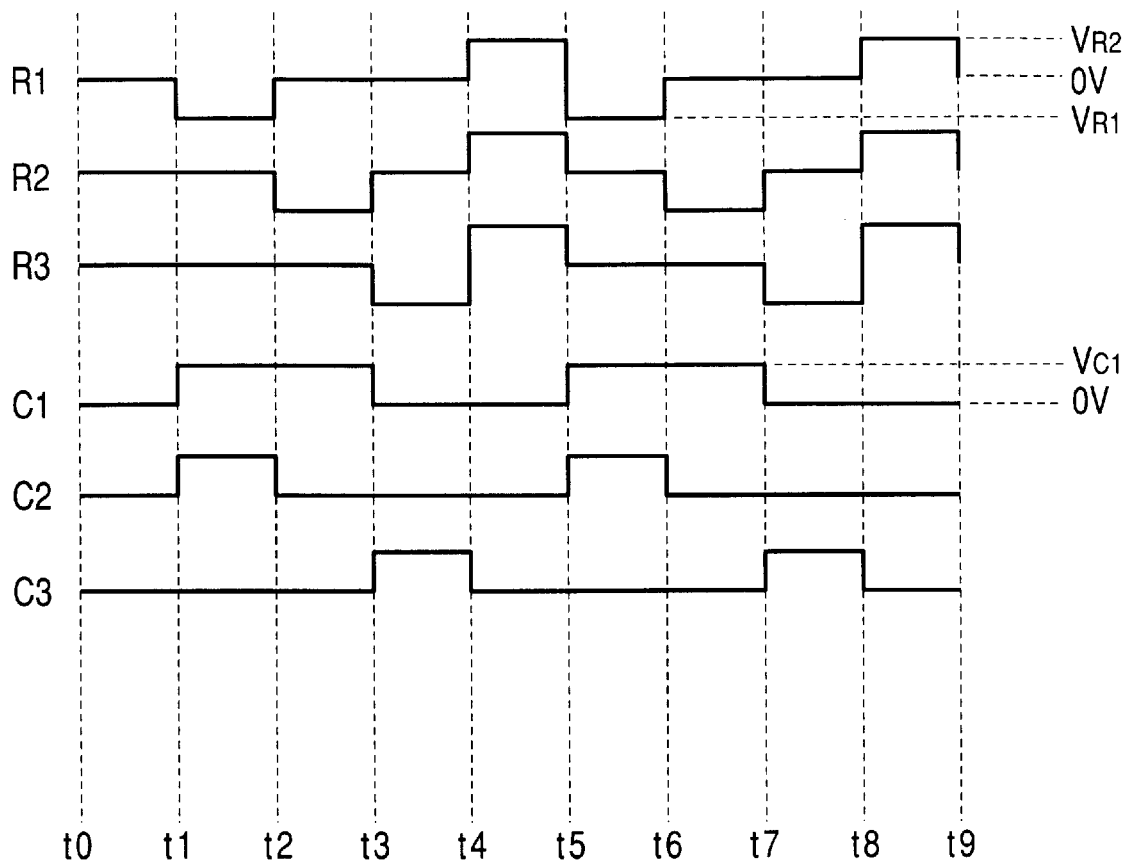
FIG. 8 is a timing chart showing one example illustrative of waveforms of driving voltages outputted from the respective driving circuits shown in FIG. 7.

FIG. 8 is a timing chart showing one example illustrative of waveforms of driving voltages outputted from the respective driving circuits shown in FIG. 7.

Let's now assume that an nth row electrode 310 is represented as Rn, an mth column electrode 311 is represented as Cm, and a dot for an intersection of the nth row electrode 310 and the mth column electrode 311 is represented as (n, m) At a time t0, any electrode carries a voltage of 0 and hence no electrons are emitted, whereby the phosphors (114A through 114C) do not emit light.

At a time t1, the row electrode driving circuit 41 applies a driving voltage of ($V_{R1}$) to its corresponding row electrode 310 of R1, and the column electrode driving circuits 42 apply a driving voltage of ($V_{C1}$) to their corresponding column electrodes 311 of (C1 and C2).

Since a voltage of ($V_{C1}-V_{R1}$) is applied between the top electrode 11 and the base electrode 13 for dots (1, 1) and (1, 2) through the pixel resistor 305, thin-film electron emitters for the two dots emit electrons into vacuum if the voltage of ($V_{C1}-V_{R1}$) is set to greater than or equal to a threshold voltage for electron emission.

In the present embodiment, $V_{R1}=-5V$ and $V_{C1}=4.5V$.

The emitted electrons are accelerated by the voltage applied to the metal back film 122 and thereafter collide with the phosphors (114A through 114C) to thereby allow the phosphors (114A through 114C) to emit light.

When the row electrode driving circuit 41 applies the driving voltage of ($V_{R1}$) to s corresponding row electrode 310 of R2, and the column electrode driving circuit 42 applies the voltage of ($V_{C1}$) to its corresponding column electrode 311 of C1 at a time t2, a dot (2, 1) lights up similarly.

When the driving voltages having such voltage waveforms as shown in FIG. 8 are applied to their corresponding row and column electrodes 310 and 311, only dots diagonally shaded in FIG. 7 light up.

In this way, changing the signals applied to the column electrodes 311 allows the display of a desired image or information.

By suitably changing the magnitude of the driving voltage ($V_{C1}$) applied to each column electrode 311 in accordance with an image signal, an image having a gray scale can be displayed.

Incidentally, in order t release the charges accumulated in the tunneling insulator 12, the row electrode driving circuits 41 apply a driving voltage of ($V_{R2}$) to all of the row electrodes 310 and simultaneously the column electrode driving circuits 42 apply a driving voltage of 0 V to all of the column electrodes at a time t4 in FIG. 8.

Since $V_{R2}=5$ V now, a voltage of a $-V_{R2}=-5$ V is applied to each of the thin-film electron emitters 301.

Applying the voltage (reverse pulse) of polarity opposite to at electron emission in this way allows an improvement in lifetime characteristic of each thin-film electron emitter.

Incidentally, the use of a vertical blanking period of a video signal as reverse pulse applying periods (see t4 to t5 and t8 to t9 in FIG. 18) yields satisfactory matching with the video signal.

Embodiment 2

Figure 9:
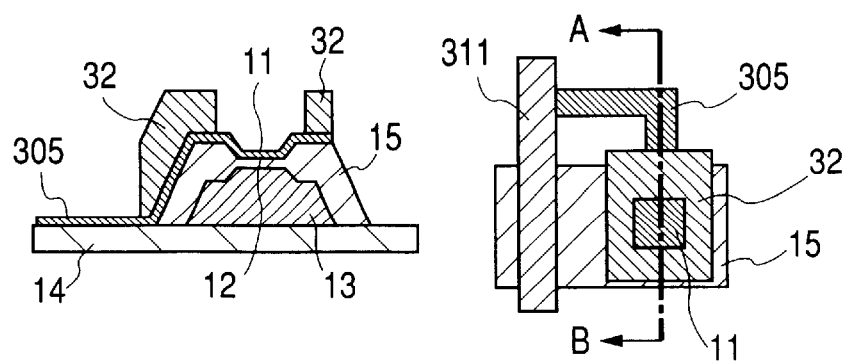
FIG. 9 is a diagram showing a configuration of one thin-film electron-emitter matrix of a cathode plate employed in an embodiment 2 of the present invention.

FIG. 9 is a diagram showing a configuration of one thin-film electron-emitter element 301 of a thin-film electron-emitter matrix of a cathode plate employed in an embodiment 2 of the present invention. The right side is a plan view and the left side is a cross-sectional view taken along a cut line A–B.

In the present embodiment, a pixel resistor 305 is formed of the same material as a top electrode 11.

A production process is simplified by forming the pixel editors 305 with the same material as the top electrode 11 in this way.

The resistance value of the pixel resistor 305 in this case is defined as the value of resistance between a column electrode 311 and a top electrode busline 32 in a manner similar to the embodiment 1.

Ones other than such a pixel structure are similar to the first embodiment.

Figure 10:
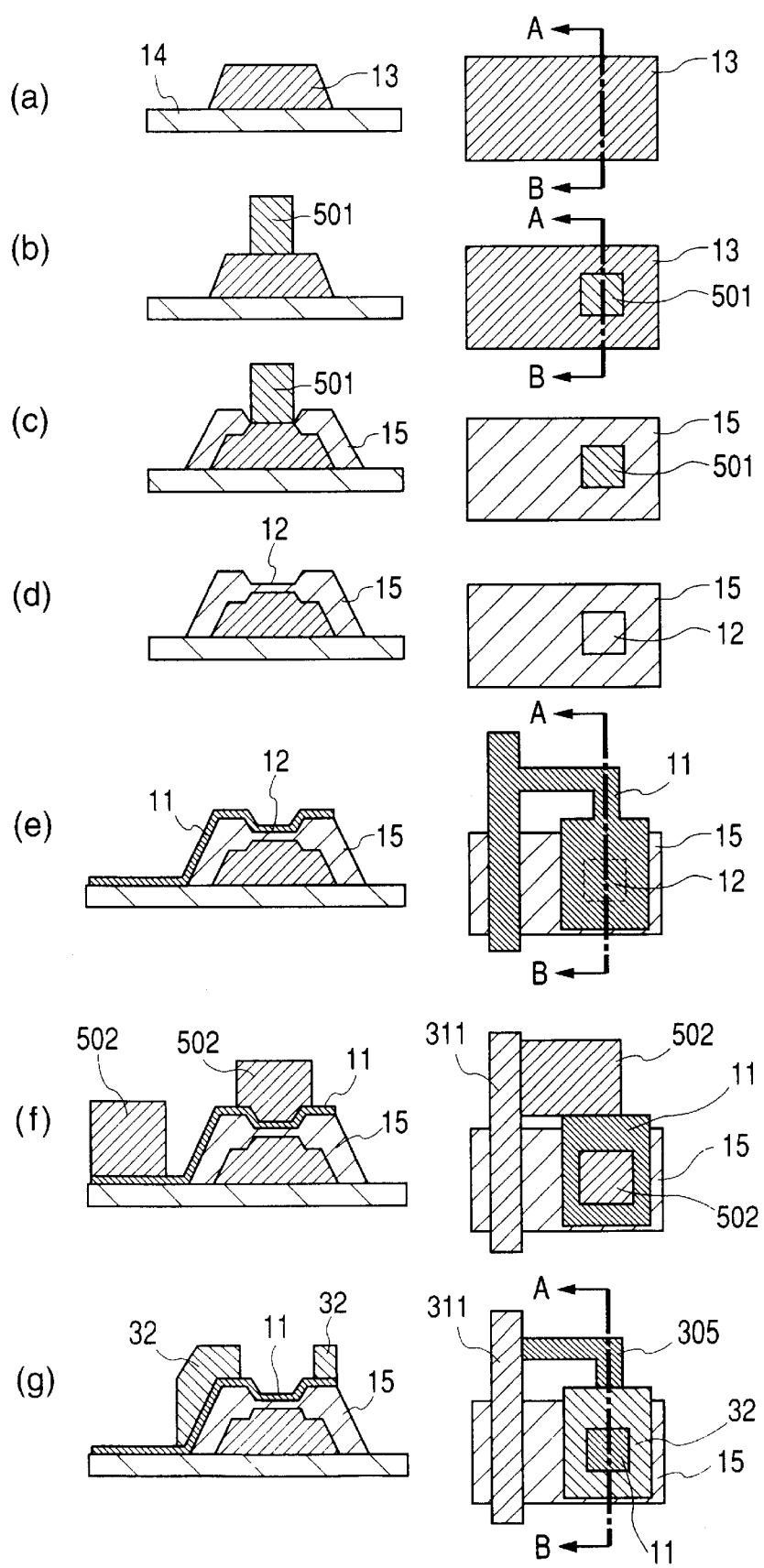
FIGS. 10(a) through 10(g) are respectively diagrams for describing a method of manufacturing the thin-film electron-emitter matrix of the cathode plate employed in the embodiment 2 of the present invention.

FIG. 10 is a diagram for describing a method of manufacturing the thin-film electron-emitter matrix of the cathode plate according to the present embodiment.

Incidentally, only one thin-film electron-emitter element 301 formed at the intersection of one of the row electrodes 310 and one of the column electrodes 311 in FIG. 1 is extracted and plotted in FIG. 10.

The right column in FIG. 10 shows plan views and the left column shows cross-sectional views taken along cut lines A–B in the right drawings.

Up to FIG. 10(d), the thin-film electron-emitter matrix is formed according to th same method as up to FIG. 5(d).

Next, Sn-doped indium oxide (i.e., ITO (Indium Tin Oxide)) film is formed by sputtering. Here, the thickness of the ITO film was set to about 10 nm.

According to a resist and patterning by etching, the ITO film is patterned to form a top electrode 11 as shown in FIG. 10(e).

Next, resists 502 are formed with a pattern shown in FIG. 10(f) and thereafter subjected to electroplating to thereby form a top electrode busline 32 and a column electrode 311.

In the present embodiment, an electroplating solution for gold-plating is used to pass current of about 0.1A/dm$^2$ through the top electrode 11, whereby a gold film is selectively grown or deposited on the top electrode 11.

The busline 32, which is about 400 nm in thickness, is formed in this way.

While the gold electroplating is used in the present embodiment, other electrode materials such as copper (Cu), Nickel (Ni), etc. may of course be used.

After the busline 32 has been formed by plating, the resists 502 are peeled off to complete the thin-film electron-emitter matrix according to the present embodiment as shown in FIG. 10(g).

The feature of the present embodiment resides in that the top electrode 11, being thin in thickness is placed below the busline 32, being thick in thickness.

Therefore, the electrical connection between the top electrode busline 32 and the top electrode 11 can be ensured with satisfactory reliability even if its connection is not made via the top electrode busline under-layer film.

The manufacturing method shown in FIG. 10 is illustrated as one example. It is needless to say that the structure shown in FIG. 9 can be formed even if plating is not used for the growth or deposition of the top electrode busline 32 and the column electrode 311.

A method of forming phosphors or the like on a plate 110, the relationship of positions between thin-film electron-emitter elements 301 and the phosphors (114A through 114C), a method of connecting driving circuits, and a method of driving the same are similar to those employed in the embodiment 1 mentioned previously.

Embodiment 3

Figure 11:
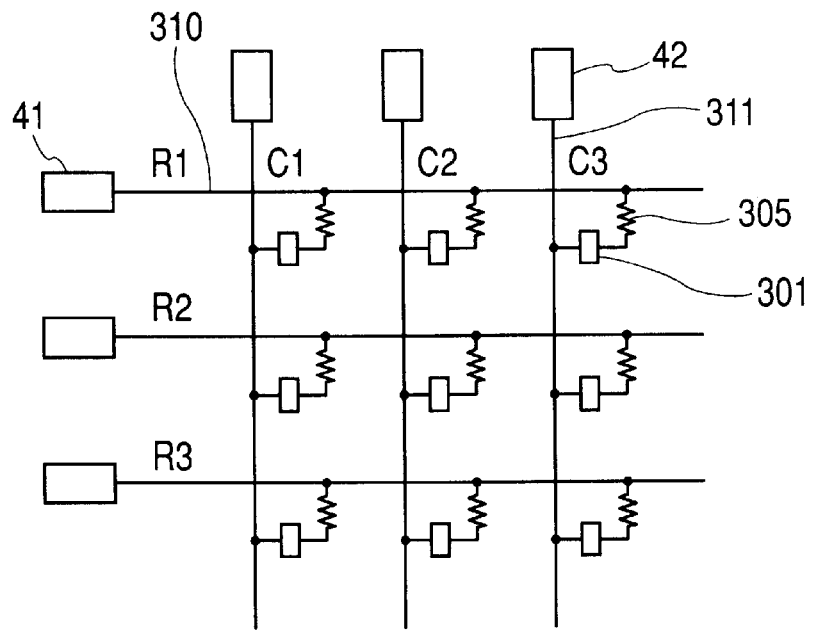
FIG. 11 is a diagram showing a schematic configuration of a thin-film electron-emitter matrix according to an embodiment 3 of the present invention.

FIG. 11 is a diagram showing a schematic configuration of a thin-film electron-emitter matrix according to an embodiment 3 of the present invention In the present embodiment as shown in FIG. 11, pixel resistors 305 are respectively inserted between row electrodes 310 and thin-film electron emitter elements 301.

Described more specifically, the pixel resistors 305 are respectively inserted between base electrodes 13 for thin-film electron-emitter elements 301 and row electrodes 310.

Figure 12:
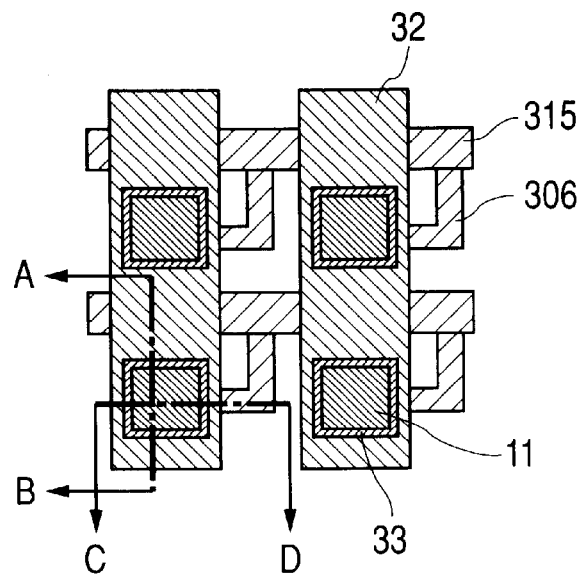
FIG. 12 is a plan view of the thin-film electron-emitter matrix according to the embodiment 3 of the present invention.
Figure 13A:
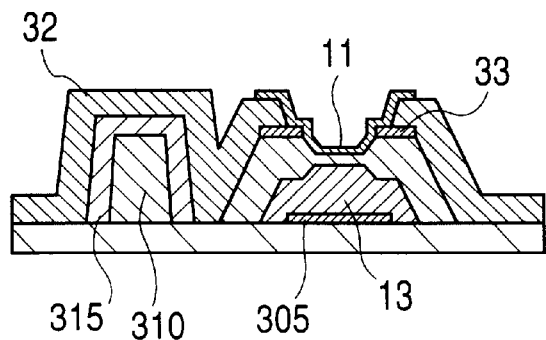
FIG. 13 is a cross-sectional view illustrating a fragmentary section structure of one thin-film electron-emitter element employed in the embodiment 3 of the present invention.
Figure 13B:
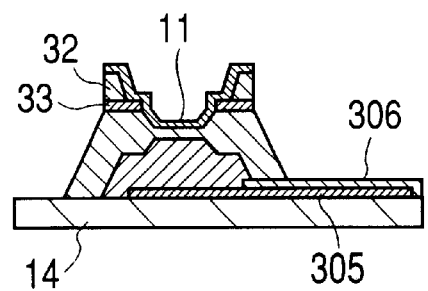
Figure 14:
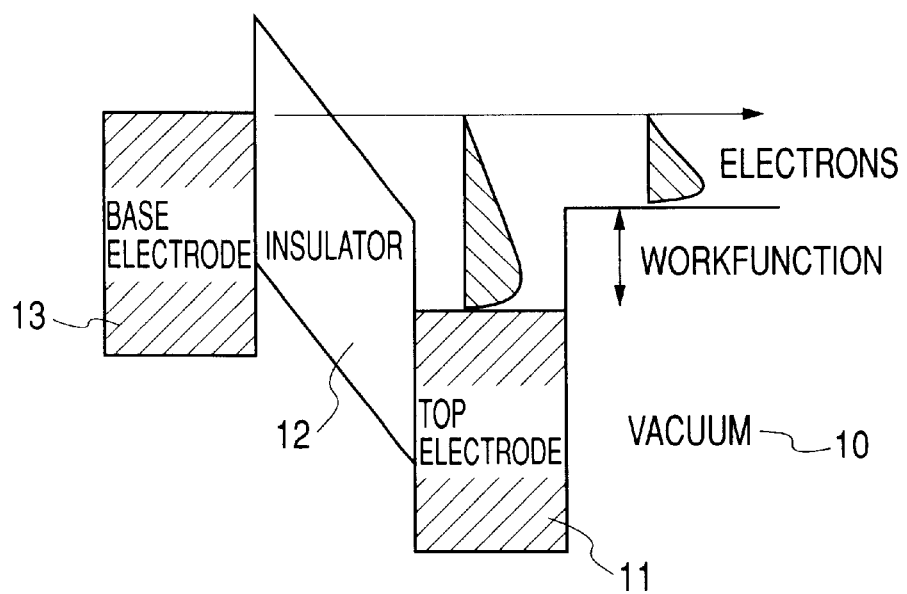
FIG. 14 is a diagram for describing the principle of operation of a thin-film electron emitter.
Figure 15:
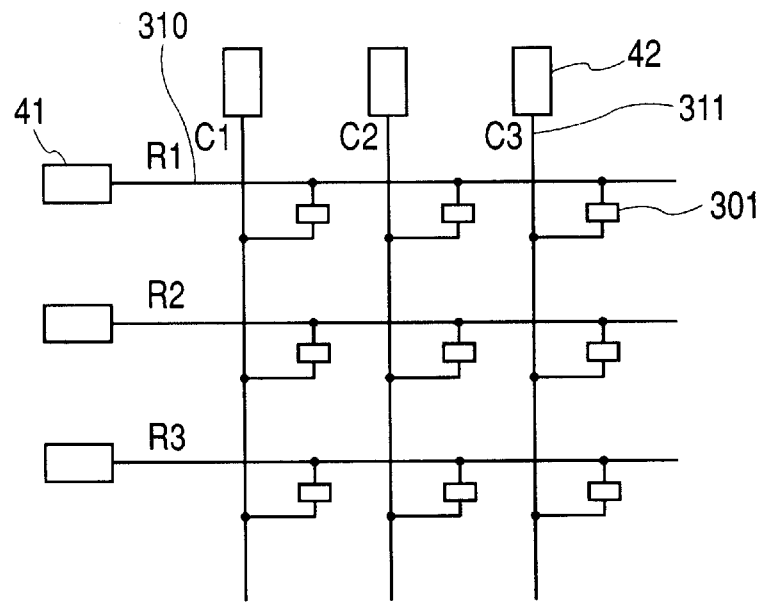
FIG. 15 is a diagram showing a schematic configuration of a conventional thin-film electron-emitter matrix.
Figure 16:
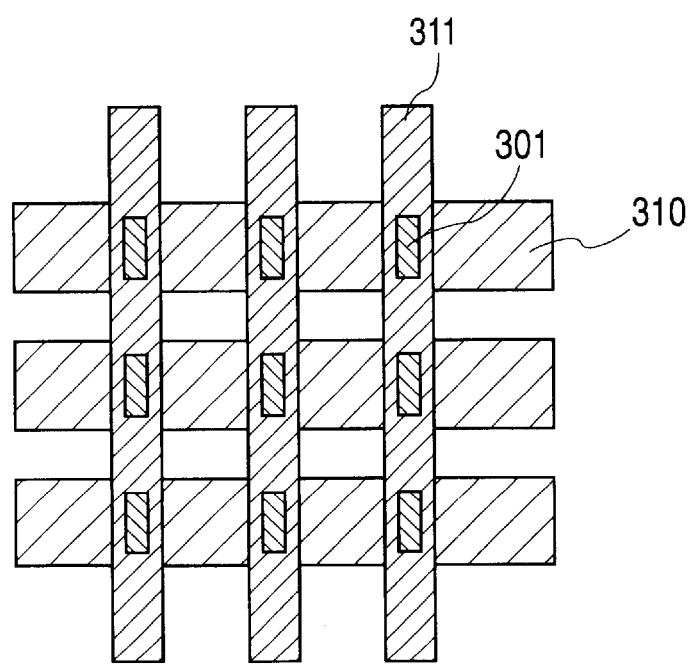
FIG. 16 is a plan view showing a pixel structure of a conventional display apparatus.

As one example for implementing a pixel structure shown in FIG. 11, a specific pixel structure is shown in FIGS. 12 and 13.

FIG. 12 is a plan view of the thin-film electron-emitter matrix according to the present embodiment.

FIG. 13 is a cross-sectional view showing a fragmentary section structure of one thin-film electron-emitter element 301 according to the present embodiment, wherein FIG. 13($a$) is a cross-sectional view taken along cut line A–B of FIG. 12, and FIG. 13($b$) is a cross-sectional view taken along cut line C–D of FIG. 12.

As shown in FIG. 12, a pixel resistor 305 connects between a row electrode 310 and a base electrode 13.

The pixel resistor 305 is covered with a pixel-resistor insulator 306, and the row electrode 310 is covered with a row-electrode insulator 315.

The base electrode 13 is formed of an Al—Nd alloy or the like at a portion corresponding to the thin-film electron-emitter element (pixel) 301.

Subsequently, a thin-film electron emitter may be formed according to a method substantially similar to the method described in the embodiment 1.

As is understood from FIG. 12, the column electrode 311 and the top electrode buslines 32 are identical in the present embodiment.

It is therefore easy to finely fabricate the pitch between the columns adjacent to each other.

In a sub-pixel-configured color display apparatus of a vertical RGB-stripe pattern, a sub-pixel pitch in a column direction, i.e., the pitch of an arrangement of the thin-film electron-emitter elements 301 reaches ⅓ of a pitch in a row direction. It is therefore of importance that the pitch in the column direction can finely be set. This results in the advantage of this pixel structure.

However, a drawback arises in that the production process becomes slightly complex as compared with the embodiments 1 and 2.

A method of forming phosphors or the like on a plate 110, the relationship of positions between thin-film electron-emitter elements 301 and the phosphors (114A through 114C), a method of connecting driving circuits, and a method of driving the same are similar to those employed in the embodiment 1.

While the example (FIG. 1) of connecting the pixel resistors 305 to their corresponding column electrodes 311 and the example (FIG. 11) of connecting the same to their corresponding row electrodes 310 have been made in the above description, it is needless to say that the effect of the present invention is obtained even if the pixel resistors 305 are inserted between the column electrodes 311 and electron-emitter element as well as between row electrodes 310 and electron-emitter element.

While the embodiments in which the pixel resistors 305 have been connected to all the electron-emitter elements 301, have been described in the respective embodiments, the electron-emitter elements 301 to which no pixel resistors 305 are connected, may be provide in any number within a range in which a production yield is not extremely reduced.

While the invention made by the present inventors has been described specifically by the illustrated embodiments, the present invention is not limited to the embodiments. It is needless to say that various changes can be made thereto within the scope not departing from the substance thereof.

Advantageous effects obtained by typical one of the inventions disclosed in the present application will be explained in brief as follows:

(1) According to an image display of the present invention, a production yield can be enhanced since it is possible to prevent point defects from bringing about a "line defect".

(2) According to an image display of the present invention, since it is possible to lessen the influence of a deviation in wire resistance and a deviation in the characteristic of a driving circuit on the non-uniformity across the display area in brightness and the amount of a emission current, the fabrication thereof becomes easy, and the production cost thereof can be reduced.

What is claimed is:

1. An image display display comprising:

a display device including, a first plate having, a plurality of electron-emitter elements each having a structure comprised of a base electrode, an insulating layer and a top electrode stacked on one another in this order, said electron-emitter element emitting electrons from the surface of the top electrode when a voltage of positive polarity is applied to the top electrode;

a plurality of first electrodes for respectively applying driving voltages to the base electrodes of the electron-emitter elements lying in a row (or column) direction, of said plurality of electron-emitter elements; and a plurality of second electrodes for respectively applying driving voltages to the top electrodes of the electron-emitter elements lying in the column (or row) direction, of said plurality of electron-emitter elements;

a frame component; and a second plate having phosphors;

wherein a space surrounded by said first plate, said frame component and said second plate is brought into vacuum;

wherein at least on said electron-emitter element includes its corresponding base electrode and top electrode, at least one of which is connected to the first electrode or second electrode through a resistor element.

2. An image display display comprising:

a display device including, a first plate having, a plurality of electron-emitter elements each having a structure comprised of a base electrode, an insulating layer and a top electrode stacked on one another in this order, said electron-emitter element emitting electrons from the surface of the top electrode when a voltage of positive polarity is applied to the top electrode;

a plurality of first electrodes for respectively applying driving voltages to the base electrodes of the electron-emitter elements lying in a row (or column) direction, of said plurality of electron-emitter element; and a plurality of second electrodes for respectively applying driving voltages to the top electrodes of the electron-emitter elements lying in the column (or row) direction, of said plurality of electron-emitter elements;

a frame component; and a second plate having phosphors;

wherein a space surrounded by said first plate, said frame component and said second plate is brought into vacuum;

wherein said plurality of electron-emitter elements respectively include the base electrodes and top electrodes, at least one of which are respectively connected to the first electrodes or the second electrodes through resistor elements.

3. An image display according to claim 1, further including first driving means for supplying driving voltages to said respective first electrode, and second driving means for supplying driving voltages to aid respective second electrodes, and the resistance value of said each resistor element is larger than a value obtained by multiplying a larger value of output impedance of said first driving means and an output impedance of said second driving mean by ten times.

4. An image display according to claim 1, wherein when the resistance value of the resistor element is defined as R, and the electrostatic capacitance of the electron-emitter element is defined as C, the product (R·C) of the resistance value of the resistor element and the electrostatic capacitance of the electron-emitter element is smaller than a horizontal scanning period 1H of a displayed video signal.

5. An image display according to claim 1, wherein the resistance value of the resistor element is smaller than a differential resistance of the electron-emitter element in an operation region thereof.

6. An image display according to claim 1, wherein each of said resistor elements includes at least some portion thereof that does not intersect either the first electrodes or the second electrodes.

7. An image display according to claim 1, wherein the resistor element has at least one bend.

8. An image display according to claim 1, wherein the resistor element has a portion narrower than other portions in line width or a portion thinner than other portions in thickness.

9. An image display according to claim 1, wherein said each first electrode shares the base electrode of said each electron-emitter element, and the electron-emitter element connected with the resistor element includes the top electrode connected to the second electrode through the resistor element.

10. An image display according to claim 9, wherein the electron-emitter element connected with the resistor element has a top electrode busline under-layer film electrically connected to the top electrode, and the resistor element is formed of the same material as the top electrode busline under-layer film.

11. An image display according to claim 10, further including top electrode buslines, each of which is provided so as to cover an edge of the base electrode, and is on the top electrode busline under-layer film.

12. An image display according to claim 9, wherein the resistor element is formed of the same material as the top electrode of the electron-emitter element connected with the resistor element.

13. An image display according to claim 12, further including top electrode busline each electrically connected to the top electrode and provided so as to cover an edge of the base electrode.

14. An image display according to claim 1, wherein said each electron-emitter element has a top electrode busline which is electrically connected to the top electrode and shares the second electrode, and the electron-emitter element connected with the resistor element includes the base electrode connected to the first electrode through the resistor element.

15. An image display according to claim 1, wherein electron-emitter elements from which the resistor elements are respectively cut off and which are respectively electrically disconnected from the first electrodes or the second electrodes.

16. An image display display comprising:

a display device including, a first plate having, a plurality of electron-emitter elements each having a structure comprised of a base electrode, an insulating layer and a top electrode stacked on one another in this order, said electron-emitter element emitting electrons from the surface of the top electrode when a voltage of positive polarity is applied to the top electrode;

a plurality of first electrodes for respectively applying driving voltages to the base electrodes of the electron-emitter elements lying in a row (or column) direction, of said plurality of electron-emitter element; and a plurality of second electrodes for respectively applying driving voltages to the top electrodes of the electron-emitter elements lying in the column (or row) direction, of said plurality of electron-emitter elements;

a frame component; and a second plate having phosphors;

wherein a space surrounded by said first plate, said frame component and said second plate is brought into vacuum, and wherein a plurality of said electron-emitter elements respectively include the base electrodes and the top electrodes, at least one of which are respectively connected to the first electrodes or the second electrodes through connection wires.

17. An image display a according to claim 16, wherein each of said connection wires includes at least some portion thereof that does not intersect either the first electrodes or the second electrodes.

18. An image display according to claim 16, wherein the connection wire has at least one bend.

19. An image display according to claim 16, wherein the connection wire has a portion narrower than other portions in line width or a portion thinner than other portions in thickness.

20. An image display according to claim 16, further including electron-emitter elements from which the connection wires are cut and which are electrically disconnected from the first electrodes or the second electrodes.

21. A method of manufacturing an image display comprising:

a display device including, a first plate having, a plurality of electron-emitter elements each having a structure comprised of a base electrode, an insulating layer and a top electrode stacked on one another in this order, said electron-emitter element emitting electrons from the surface of the top electrode when a voltage of positive polarity is applied to the top electrode;

a plurality of first electrodes for respectively applying driving voltages to the base electrodes of the electron-emitter elements lying in a row (or column) direction, of said plurality of electron-emitter elements; and a plurality of second electrodes for respectively applying driving voltages to the top electrodes of the electron-emitter elements lying in the column (or row) direction, of said plurality of electron-emitter elements;

a frame component; and a second plate having phosphors;

wherein a space surrounded by said first plate, said frame component and said second plate is brought into vacuum, and wherein said respective electron-emitter elements have the base electrodes and the top electrodes, at least one of which are respectively connected to the first electrodes or the second electrodes through resistor elements, said method comprising the step of:

cutting the resistor elements corresponding to arbitrary electron-emitter elements of said plurality of electron-emitter elements and electrically disconnecting the arbitrary electron-emitter elements from the first electrodes or the second electrodes.

22. A method of manufacturing an image display comprising:

a display device including, a first plate having, a plurality of electron-emitter elements each having a structure comprised of a base electrode, an insulating layer and a top electrode stacked on one another in this order, said electron-emitter element emitting electrons from the surface of the top electrode when a voltage of positive polarity is applied to the top electrode;

a plurality of first electrodes for respectively applying driving voltages to the base electrodes of the electron-emitter elements lying in a row (or column) direction, of said plurality of electron-emitter element; and a plurality of second electrodes for respectively applying driving voltages to the top electrodes of the electron-emitter elements lying in the column (or row) direction, of said plurality of electron-emitter elements;

a frame component; and a second plate having phosphors;

wherein a space surrounded by said first plate, said frame component and said second plate is brought into vacuum, and wherein said respective electron-emitter elements have the base electrodes and the to electrodes, at least one of which are respectively connected to the first electrodes or the second electrodes through connection wires, said method comprising the step of:

cutting the connection wires corresponding to arbitrary electron-emitter elements of said plurality of electron-emitter elements and electrically disconnecting the arbitrary electron-emitter elements from the first electrodes or the second electrodes.

* * * * *